(12) United States Patent
Wang et al.

(10) Patent No.: US 8,977,051 B2
(45) Date of Patent: Mar. 10, 2015

(54) IMAGE ENHANCEMENT METHOD FOR IMPROVING COLOR PERCEPTION OF COLORBLIND VIEWERS

(71) Applicant: Show Chwan Memorial Hospital, Changhua, Changhua County (TW)

(72) Inventors: Min-Liang Wang, Taichung (TW); Huei-Yung Lin, Chiayi County (TW); Li-Qi Chen, Taichung (TW); Shih-Chun Chao, Taichung (TW); Lih-Ching Lai, Chiayi (TW)

(73) Assignee: Show Chwan Memorial Hospital, Changhua (TW)

( * ) Notice: Subject to any disclaimer, the term of this patent is extended or adjusted under 35 U.S.C. 154(b) by 145 days.

(21) Appl. No.: 13/834,051

(22) Filed: Mar. 15, 2013

(65) Prior Publication Data
US 2014/0270516 A1    Sep. 18, 2014

(51) Int. Cl.
*G06K 9/00*    (2006.01)
*G06T 5/50*    (2006.01)
*G06T 5/40*    (2006.01)

(52) U.S. Cl.
CPC .... *G06T 5/50* (2013.01); *G06T 5/40* (2013.01)
USPC ........... 382/167; 382/162; 382/163; 382/254; 382/274

(58) Field of Classification Search
USPC ................ 382/162, 163, 167, 254, 274, 275; 351/44, 159.3, 242, 246; 345/88, 48, 345/102, 207, 589, 690; 348/E13.037, 348/E13.059
See application file for complete search history.

(56) References Cited

U.S. PATENT DOCUMENTS

| | | | | |
|---|---|---|---|---|
| 3,586,423 | A * | 6/1971 | Zeltzer | 351/246 |
| 5,408,278 | A * | 4/1995 | Christman | 351/44 |
| 8,605,017 | B2 * | 12/2013 | Brown Elliott et al. | 345/88 |
| 8,698,834 | B2 * | 4/2014 | Brown Elliott | 345/589 |

* cited by examiner

*Primary Examiner* — Anh Do
(74) *Attorney, Agent, or Firm* — Pai Patent & Trademark Law Firm; Chao-Chang David Pai

(57) ABSTRACT

An image enhancement method for improving color perception of colorblind viewers has an image input step, an image difference area analyzing step, an image color distribution adjusting step, and an image output step. In such method, a normal image and a colorblindness-simulative image are input and calculated to produce a colorblindness-optimized image. Color vision obtained by a colorblind person from the colorblindness-optimized image is substantially identical to that obtained by a person with normal color perception from the normal image.

3 Claims, 6 Drawing Sheets

IMAGE ENHANCEMENT METHOD FOR IMPROVING COLOR PERCEPTION OF COLORBLIND VIEWERS

BACKGROUND OF THE INVENTION

1. Field of the Invention

The present invention relates to an image enhancement method, and more particularly to an image enhancement method for improving color perception of colorblind viewers. The image enhancement method helps and improves color observation of colorblind people.

2. Description of Related Art

Color identification disturbance, so-called color blindness, means that a person completely or partially lacks the ability to see color or perceive color difference. In other words, the person of colorblindness can only observe a limited visible color spectrum. The colorblindness is usually caused by the natural genetic factor, by damage of eyes, optic nerves or brain such as trauma and glaucoma, or by contact of chemical materials. A colorblind person's retinal cone has different responses to visible lights from both natural and digital images when compared to that of a person with normal vision. Colorblind people encounter limitation in certain social activities; for example, the colorblind people are forbidden to apply for driving licenses. Because of the defects on color perception, colorblind people, even having great interests, cannot undertake works or jobs in fields of art, medicine, chemical engineering, electrical engineering and telecommunication that need to massively implement color identification.

In the medical field, two treatments are employed to cure colorblind people. An acquired colorblind person can recover normal color perception as owned by a normal person after taking corresponding medicine or prescription by doctors. However, an inborn colorblind person cannot be cured by medicine or surgery. Some treatments are said to be capable of curing the inborn colorblindness, such as massage on acupuncture points and wearing glasses with specific coatings. Acupuncture point massage is futile to genetic factors and cannot be proved effective for curing inborn color blindness. Color correction by glasses works by the principle of blocking lights of specific wavelengths so that color difference is correctly presented in human brain. However, such color correction by glasses may be effective only for red-green color differentiation. In recent years, an improved treatment has been developed to treat colorblindness. The improved treatment sets specific colored light detectable opsin gene into a virus carrier, injects the virus carrier into the retina of a subject, and then adds missing gene to recover full color vision without modification of brain. However, such treatment is not proved safe yet.

Researches in engineering have developed the following methods for correcting colorblindness.

1. Color filters are used to filter colored light and produce color difference. Some color filters are designed to help colorblind car drivers to identify traffic lights.

2. Color differentiation algorithms are developed for enhancing colors that can be originally identified by colorblind users and producing color difference to colorblind users.

However, the aforementioned device and method are insufficient to improve the color vision of colorblind people.

To overcome the shortcomings, the present invention provides an image enhancement method for improving color perception of colorblind viewers to mitigate or obviate the aforementioned problems.

SUMMARY OF THE INVENTION

The main objective of the invention is to provide an image enhancement method for improving color perception of colorblind viewers. The image enhancement method helps and improves color observation of colorblind people.

An image enhancement method for improving color perception of colorblind viewers in accordance with the present invention has an image input step, an image difference area analyzing step, an image color distribution adjusting step, and an image output step. In such method, a normal image and a colorblindness-simulative image are input and calculated to produce a colorblindness-optimized image. Color vision obtained by a colorblind person from the colorblindness-optimized image is substantially identical to that obtained by a person with normal color perception from the normal image.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
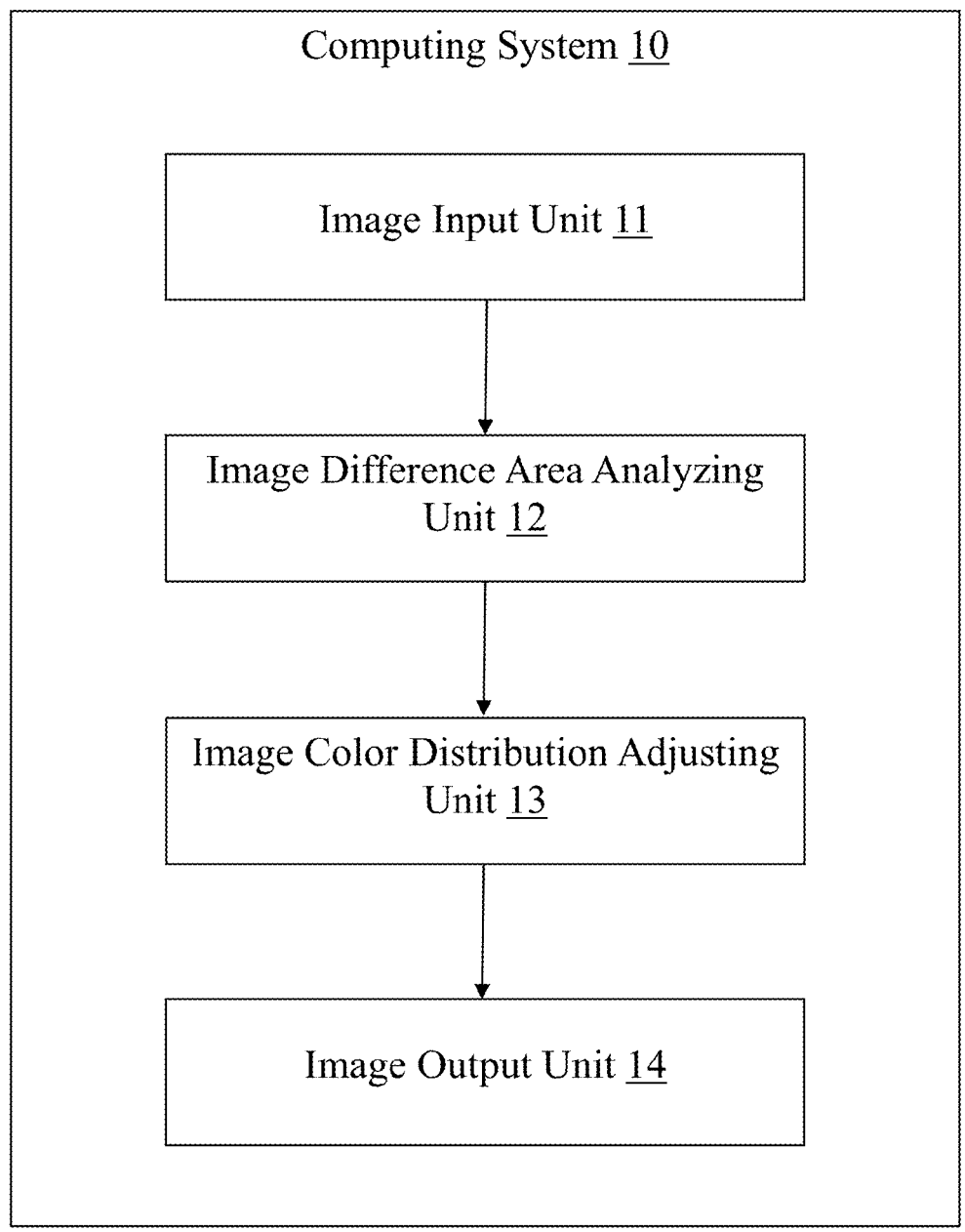
FIG. 1 is a diagram of a computing system employed to implement an image enhancement method for improving color perception of colorblind viewers in accordance with the present invention.

With reference to FIG. 1, an image enhancement method for improving color perception of colorblind viewers in accordance with the present invention is implemented by a computing system 10.

The computing system 10 has an image input unit 11, an image difference area analyzing unit 12, an image color distribution adjusting unit 13, and an image output unit 14. The image input unit 11 may be a card reader or a universal serial bus (USB) receptacle connector. The image difference area analyzing unit 12 and the image color distribution adjusting unit 13 may be two separate central or graphic processing units or integrated into a single central or graphic processing unit, is electrically connected directly or indirectly to the image input unit 11, and is capable of processing image difference area analysis and image color distribution adjustment. The image output unit 14 may be a storage device, a display or a printer for receiving, storing or presenting a processed image by the image enhancement method. The image output unit 14 is electrically connected directly or indirectly to the image difference area analyzing unit 12 and the image color distribution adjusting unit 13.

Figure 2A:
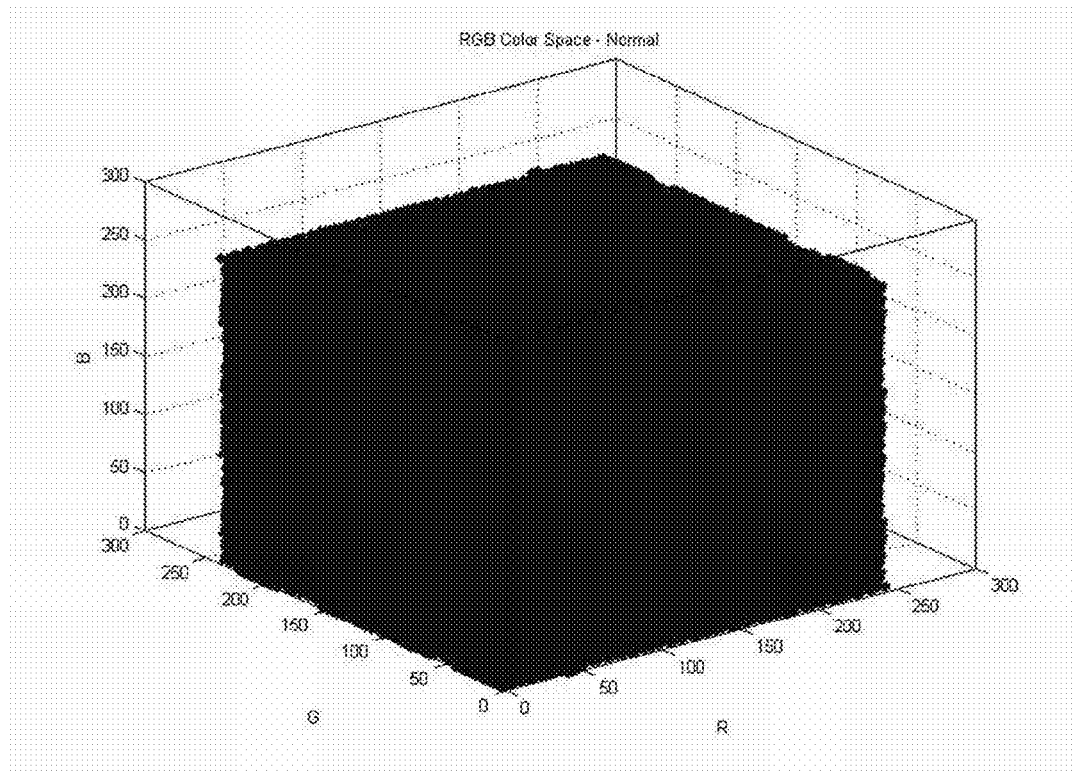
FIG. 2A is a three dimensional schematic graph of distribution of a normal and full colored image in red-green-blue (RGB) color space.
Figure 2B:
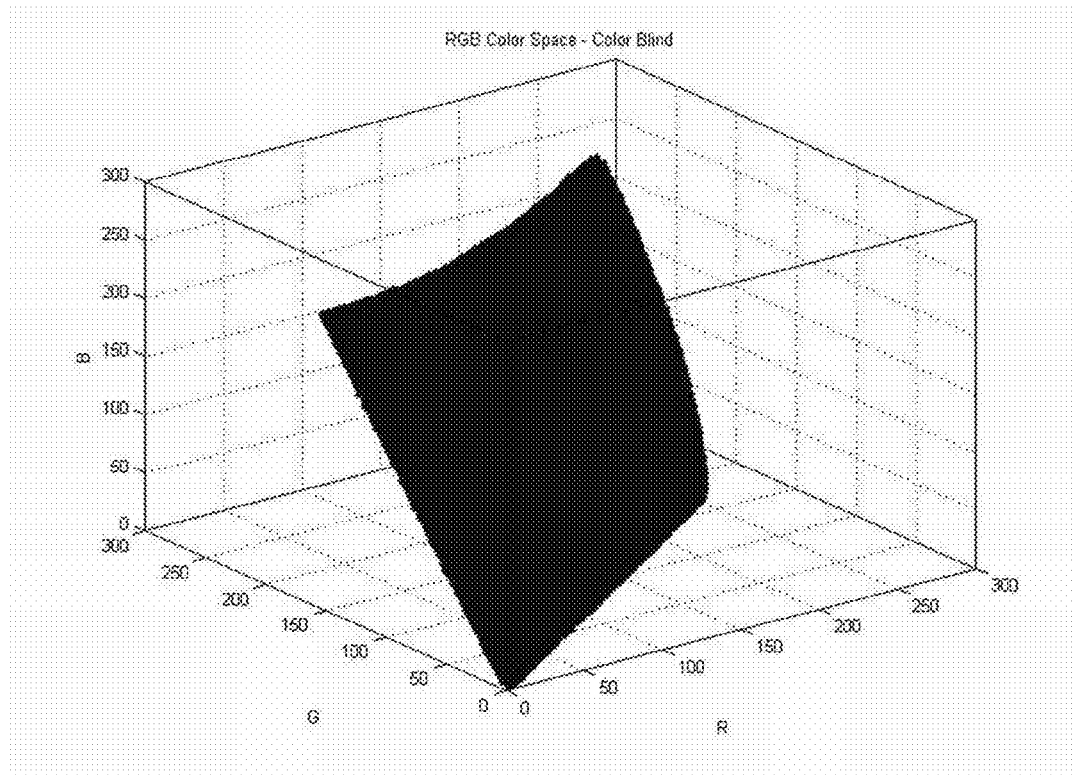
FIG. 2B is a three dimensional schematic graph of distribution of a simulative image as identified by a person with red colorblindness of FIG. 2B in RGB color space.

A normal image is input into the computing system 10 through the image input unit 11. For example, the normal image may be a full color image defined by the RGB 256 color model seen by a person with normal color vision. A colorblindness-simulative image, is also input into the computing system 10. The colorblindness-simulative image may be produced based on the full color image. The normal image and the colorblindness-simulative image are analyzed by the computing system 10 based on an RGB color space such as the CIE 1931 XYZ color space or the like. The full color image is analyzed by the computing system 10 to produce a three dimensional graph of RGB color space distribution, as shown in FIG. 2A. Also, the colorblindness-simulative image is analyzed by the computing system 10 to produce a three dimensional graph of RGB color space distribution, as shown in FIG. 2B. Obviously the RGB color space distribution of the colorblind simulative image is more concentrated and narrower than that of the full color image.

Figure 3:
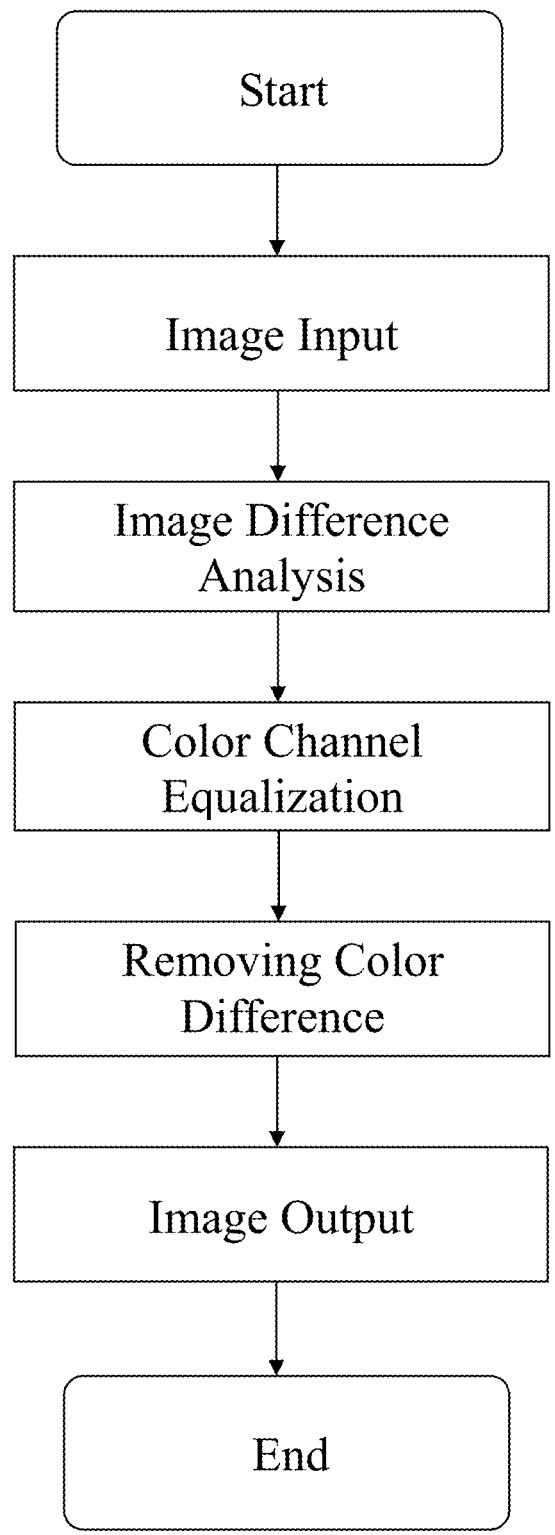
FIG. 3 is a flow chart of an algorithm corresponding to the image enhancement method in FIG. 1.

With further reference to FIG. 3, the image enhancement method in accordance with the present invention may be in form of an algorithm embedded in the aforementioned computing system 10 and comprises: an image input step, an image difference area analyzing step, an image color distribution adjusting step, and an image output step. Furthermore, the following equations 1.1, 1.2 and 1.3 are employed in the aforementioned steps.

$$I_{Dif} = |I_N - I_C| I_{Dif}, I_N, I_C \in [0, 1]^3 \quad \text{Equation 1.1}$$

$$dest(i, j) = [src(i, j) - (MAX + MIN)/2] \times 256/(MAX - MIN) + 128 \quad \text{Equation 1.2}$$

$$CR(R, G, B) = [N(R, G, B)] - D(R, G, B) + \begin{bmatrix} \alpha_R & \beta_R & \gamma_R \\ \alpha_G & \beta_G & \gamma_G \\ \alpha_B & \beta_B & \gamma_B \end{bmatrix} E(R, G, B)^T \quad \text{Equation 1.3}$$

The image input step is implemented by the image input unit 11 and is inputting a normal image as perceived by a person with normal color perception and inputting a colorblindness-simulative image as perceived by a colorblind person.

The image difference area analyzing step is implemented by the image difference area analyzing unit 12 and is distinguishing difference between the normal image and the colorblindness-simulative image by the aforementioned equation 1.1. In the equation 1.1, a parameter $I_N$ indicates the normal image. A parameter $I_c$ indicates the colorblindness-simulative image. A parameter $I_{Dif}$ indicates the difference between the images. The difference is converted to and presented in form of an image such as a difference image.

The image color distribution adjusting step is implemented by the image color distribution adjusting unit 13 and has a color channel equalizing step and a difference removing step.

The color channel equalizing step is equalizing and enhancing R, G, and B channel images of the difference image by the equation 1.2.

In the equation 1.2, a function src (i,j) indicates a two-dimensional coordinate. Parameters MAX and MIN each respectively indicate the maximum value and minimum value in each of the R, G, and B channels. A function dest (i,j) indicates a result of the equalization of each of the R, G, and B channels. The result is converted to and presented in form of an image such as an equalized image.

The difference removing step is converting the equalized image to a colorblindness-optimized image for a colorblind person so that color vision obtained by a colorblind person from the colorblindness-optimized image is substantially identical to that obtained by a person with normal color perception from the normal image in 5A. The difference removing step uses the aforementioned equation 1.3 to convert the equalized image to a colorblindness-optimized image. In the equation 1.3, a function N(R, G, B) indicates the normal image. A function D(R, G, B) indicates the difference image. A function D(R, G, B) indicates the equalized image. A matrix function $$\begin{bmatrix} \alpha_R & \beta_R & \gamma_R \\ \alpha_G & \beta_G & \gamma_G \\ \alpha_B & \beta_B & \gamma_B \end{bmatrix}$$

is a linear combination parameter. Furthermore, $\alpha_R + \beta_G + \gamma_B = 1$, $\gamma_R + \gamma_G + \gamma_B = 1$. A function CR(R, G, B) indicates the result of the difference removal. The result is converted to and presented in form of an image such as the colorblindness-optimized image.

Figure 4A:
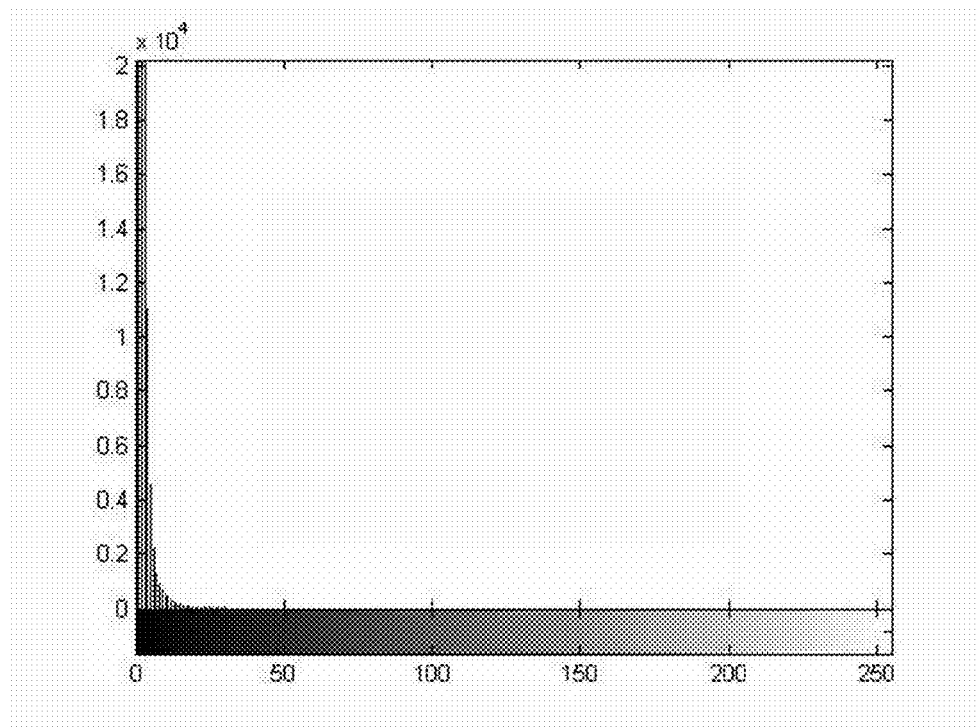
FIG. 4A is a schematic histogram of a blue color channel (B channel) of an difference image showing the color difference between a color photo image as viewed by a person without colorblindness and a simulative protanopia photo image as viewed by a person with protanopia.
Figure 4B:
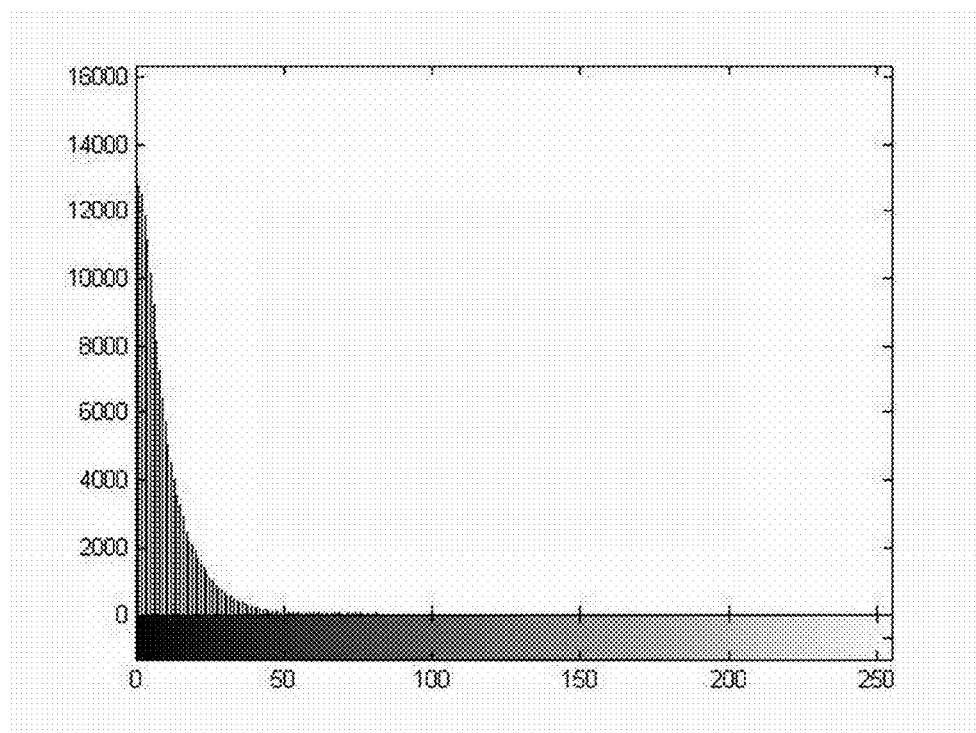
FIG. 4B is a schematic histogram of a B channel of an equalized image based on the difference image.
Figure 4C:
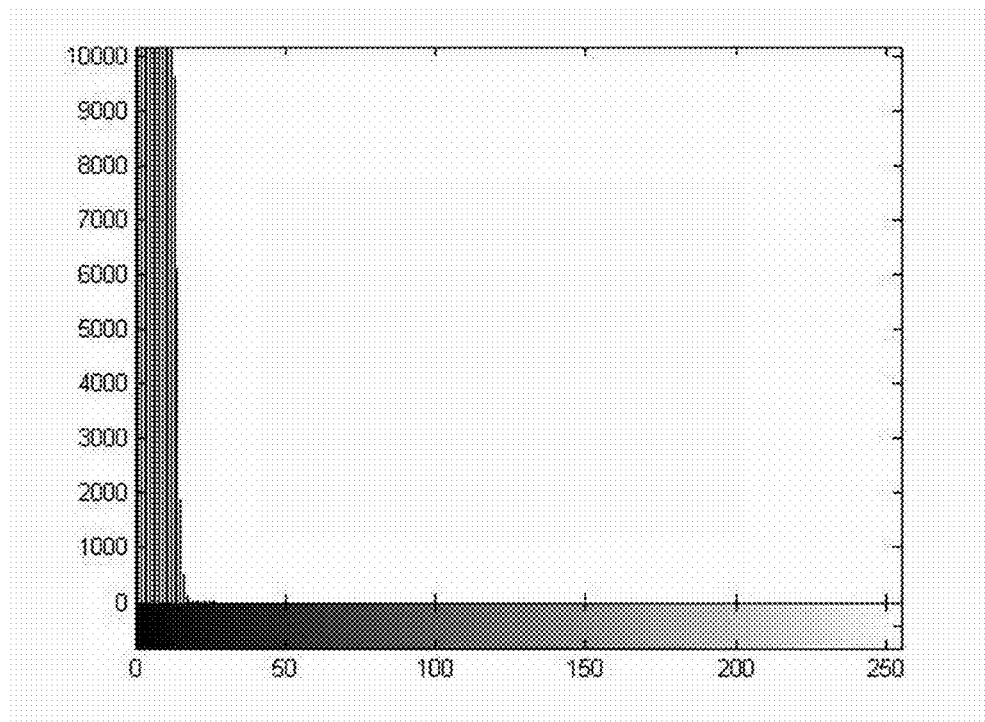
FIG. 4C is a schematic histogram of a green color channel (G channel) of the difference image.
Figure 4D:
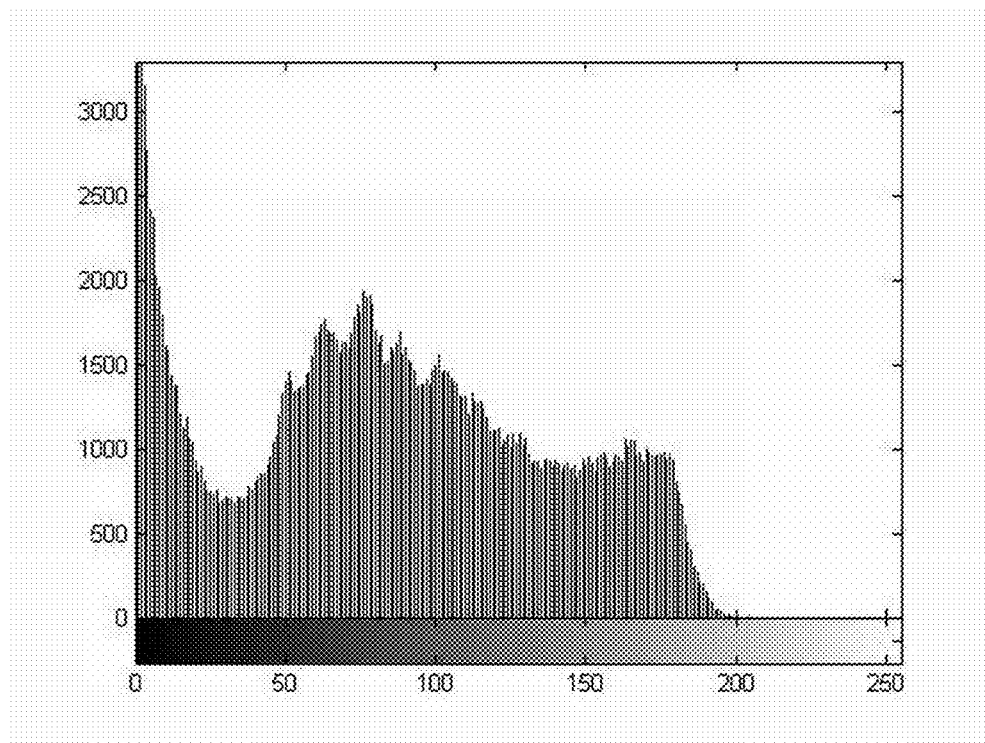
FIG. 4D is a schematic histogram of a G channel of the equalized image.
Figure 4E:
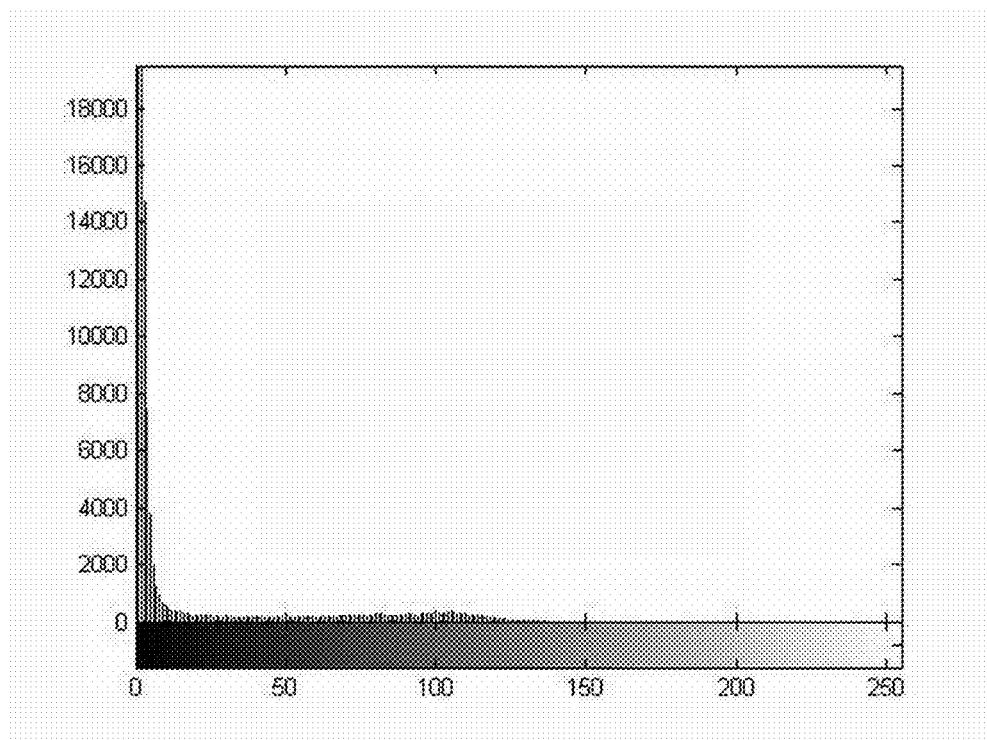
FIG. 4E is a schematic histogram of a red color channel (R channel) of the difference image.
Figure 4F:
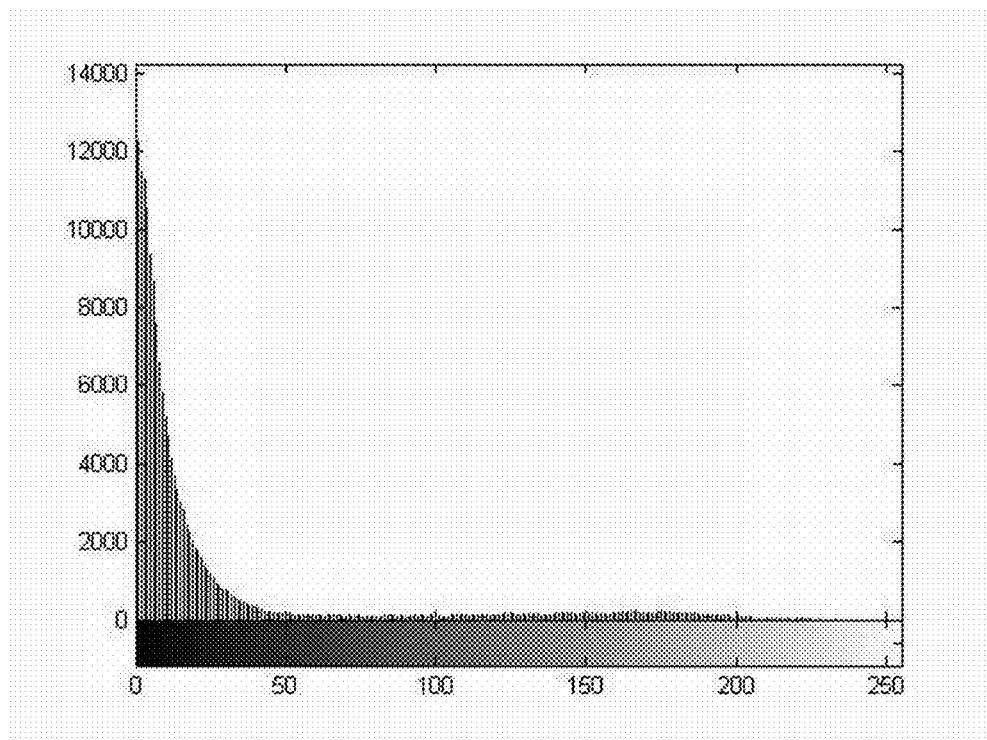
FIG. 4F is a schematic histogram of an R channel of the equalized image.

FIG. 4A is a schematic histogram of a blue color channel (B channel) of the difference image. FIG. 4B is a schematic histogram of a B channel of the equalized image based on the difference image. FIG. 4C is a schematic histogram of a green color channel (G channel) of the difference image. FIG. 4D is a schematic histogram of a G channel of the equalized image. FIG. 4E is a schematic histogram of a red color channel (R channel) of the difference image. FIG. 4F is a schematic histogram of an R channel of the equalized image.

The RGB data received by a colorblind person is different from that received by a person with normal color vision. For example, a pure red color with RGB values of Red: 255, Green: 0, Blue: 0, presents a brown color with RGB values of Red: 112, Green: 74 and: Blue 7 when visually perceived by a colorblind person's eyes. The difference removing step employs the matrix function to linearly combine the RGB values of the channels so that the color data of each channel is remixed to adjust the colorblindness-optimized image.

The image output step is implemented by the image output unit 14 and is outputting the colorblindness-optimized image into an electronic file format, visible picture on the display or a printed paper through the image output unit 14.

The image enhancement method and computing system 10 for implementing the method effectively convert normal images to colorblindness-optimized images so that colorblind viewers can acquire a normal color perception.

Even though numerous characteristics and advantages of the present invention have been set forth in the foregoing description, together with details of the structure and function of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A computing system for implementing image enhancement, comprising:

an image input unit having capabilities of inputting normal image as perceived by a person with normal color perception and of inputting a colorblindness-simulative image as perceived by a colorblind person;

an image difference area analyzing unit electrically connected to the image input unit to distinguish differences between the normal image and the colorblindness-simulative image, wherein the differences are converted into a difference image;

an image color distribution adjusting unit electrically connected to the image input unit to equalize and enhance R, G and B channel images of the difference image, wherein the difference image is converted into an equalized image, and to convert the equalized image to a colorblindness-optimized image for a colorblind person so that color vision obtained by a colorblind person from the colorblindness-optimized image is substantially identical to that obtained by a person with normal color perception from the normal image; and an image output unit electrically connected to the image difference area analyzing unit and the image color distribution adjusting unit.

2. The computing system as claimed in claim 1, wherein the image difference area analyzing unit and the image color distribution adjusting unit are separate processing units.

3. The computing system as claimed in claim 1, wherein the image difference area analyzing unit and the image color distribution adjusting unit are integrated into a single processing unit.

* * * * *